United States Patent
Fukami et al.

(10) Patent No.: US 10,423,558 B1
(45) Date of Patent: Sep. 24, 2019

(54) SYSTEMS AND METHODS FOR CONTROLLING DATA ON A BUS USING LATENCY

(71) Applicant: Apple Inc., Cupertino, CA (US)

(72) Inventors: Shawn Munetoshi Fukami, Newark, CA (US); Yiu Chun Tse, Cupertino, CA (US); David L. Trawick, Austin, TX (US); Hengsheng Geng, Austin, TX (US); Jaideep Dastidar, San Jose, CA (US); Vinodh R. Cuppu, San Jose, CA (US); Deniz Balkan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/058,433

(22) Filed: Aug. 8, 2018

(51) Int. Cl.
*G06F 3/06* (2006.01)
*G06F 13/40* (2006.01)
*G06F 13/16* (2006.01)
*G06F 13/362* (2006.01)
*G06F 9/54* (2006.01)
*G06F 13/18* (2006.01)

(52) U.S. Cl.
CPC .......... *G06F 13/4022* (2013.01); *G06F 3/067* (2013.01); *G06F 3/0611* (2013.01); *G06F 3/0659* (2013.01); *G06F 9/544* (2013.01); *G06F 13/161* (2013.01); *G06F 13/18* (2013.01); *G06F 13/362* (2013.01); *G06F 13/4031* (2013.01)

(58) Field of Classification Search
CPC ...... G06F 3/0611; G06F 3/0659; G06F 9/544; G06F 13/161
See application file for complete search history.

(56) References Cited

U.S. PATENT DOCUMENTS

| 8,856,421 | B2 | 10/2014 | Hamadani et al. |
| 9,148,384 | B2 | 9/2015 | Sherlock |
| 9,658,963 | B2 | 5/2017 | Morris et al. |
| 9,860,841 | B2 | 1/2018 | Fukami et al. |
| 9,865,315 | B1* | 1/2018 | DeSimone ............. G11C 7/222 |
| 2007/0260841 | A1* | 11/2007 | Hampel ............. G06F 13/1684 711/167 |
| 2009/0063786 | A1* | 3/2009 | Oh ....................... G06F 11/1068 711/148 |

FOREIGN PATENT DOCUMENTS

WO  2018125250  7/2018

* cited by examiner

*Primary Examiner* — Ernest Unelus
(74) *Attorney, Agent, or Firm* — Meyertons Hood Kivlin Kowert and Goetzel PC; Rory D. Rankin

(57) ABSTRACT

A system and method for efficiently routing data in a communication fabric. A computing system includes a fabric for routing data among one or more agents and a memory controller for system memory. The fabric includes multiple hierarchical clusters with a split topology where the data links are physically separated from the control links. A given cluster receives a write command and associated write data, and stores them in respective buffers. The given cluster marks the write command as a candidate to be issued to the memory controller when it is determined the write data will arrive ahead of the write command at the memory controller after being issued. The given cluster prevents the write command from becoming a candidate to be issued when it is determined the write data may not arrive ahead of the write command at the memory controller.

20 Claims, 7 Drawing Sheets

SYSTEMS AND METHODS FOR CONTROLLING DATA ON A BUS USING LATENCY

BACKGROUND

Technical Field

Embodiments described herein relate to the field of computing systems and, more particularly, to efficiently routing data in a communication fabric.

Description of the Related Art

Systems on chips (SoCs) are becoming increasingly complex with ever increasing numbers of agents within a typical SoC and available endpoints. The agents include one or more of multimedia engines, digital signal processors (DSPs) and processing units, each with one or more of a central processing unit (CPU) and a data parallel processor like a graphics processing unit (GPU). Endpoints include input/output (I/O) peripheral devices such as memory devices, communication interfaces such as radio communication interfaces, speakers, displays and so on. Data is shared among the different agents of the SoC and among the available endpoints.

Typically, an interconnect transports transactions from a source, such as an agent, to a destination such as another agent or an endpoint. In some cases, the interconnect is a communication fabric with a hierarchy of clusters between the agents and an endpoint such as a memory controller for system memory. Between each hierarchical level are multiple links. For functionality and performance reasons, a split topology is used where the data links are physically separated from the control links.

A source issues the write command of a write request on command links and issues the write data of the write request on separate data links. The source attempts to issue each of the write command and the write data close to a same point in time. The split topology allows for a higher data bus utilization through the fabric. However, the latencies through the control path and the separate data path of the split topology are unequal.

In many cases, the difference in arrival times at the destination, such as a memory controller, causes the write command to arrive at the memory controller sooner than the write data. When the write command is selected by arbitration logic to be serviced by the memory controller, clock cycles are filled with no work when there is no write data to retrieve and use for servicing. Therefore, performance reduces.

In view of the above, efficient methods and mechanisms for efficiently routing data in a communication fabric are desired.

SUMMARY

Systems and methods for efficiently routing data in a communication fabric are contemplated. In various embodiments, a computing system includes a communication fabric for routing data between one or more agents and one or more endpoints such as a memory controller for system memory. The agents include one or more of multimedia engines, digital signal processors (DSPs) and processing units, each with one or more of a central processing unit (CPU) and a data parallel processor like a graphics processing unit (GPU). Each agent and each endpoint is both a source and a destination for data depending on the direction of data flow through the communication fabric. The communication fabric is also referred to as the "fabric".

In various embodiments, the fabric includes a hierarchy of clusters between the agents and an endpoint such as a memory controller for system memory. Between each hierarchical level of the fabric hierarchy are multiple links. For functionality and performance reasons, in various embodiments, a split topology is used where the data links are physically separated from the control links. The data transferred on control links include commands and messages. The data on data links include read response data and write data for read requests and write requests, respectively.

In some embodiments, resources within a cluster are also split similar to how the links are split. In various embodiments, the split resources include a combination of combinatorial logic and sequential elements for storing data, selecting data to process, and sending selected data on corresponding links. For upstream and downstream control links, control resources of the split resources are used for performing the above steps with commands and messages. For upstream and downstream data links, data resources of the split resources are used for performing the above steps with read response data and write data.

An agent generates a write request and sends the write command of the write request on upstream control links to the memory controller. The agent also sends the write data of the write request on upstream data links to the memory controller. A given cluster within the fabric receives the write command and the write data, and stores them in respective buffers. A controller within the given cluster marks the write command as a candidate to be issued on an upstream control link when the controller determines the write data will arrive ahead of the write command at the memory controller after being issued on the upstream data link. Therefore, the memory controller won't select the write command for servicing, but not have write data for the servicing, which reduces performance.

In an embodiment, the controller determines the write data will arrive at the memory controller via the upstream data link ahead of the write command by detecting all of the write data has issued. In another embodiment, the controller determines a latency for each of the write command and remaining data of the write data to reach the memory controller from the given cluster. The controller determines the write data will arrive at the memory controller via the upstream data link ahead of the write command when the controller determines the latency for the remaining write data is less than the latency for the write command. In various embodiments, the controller in the given cluster prevents the write command from becoming a candidate to be issued on the upstream control link when the controller determines the write data may not arrive ahead of the write command at the memory controller after being issued on the upstream data link.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
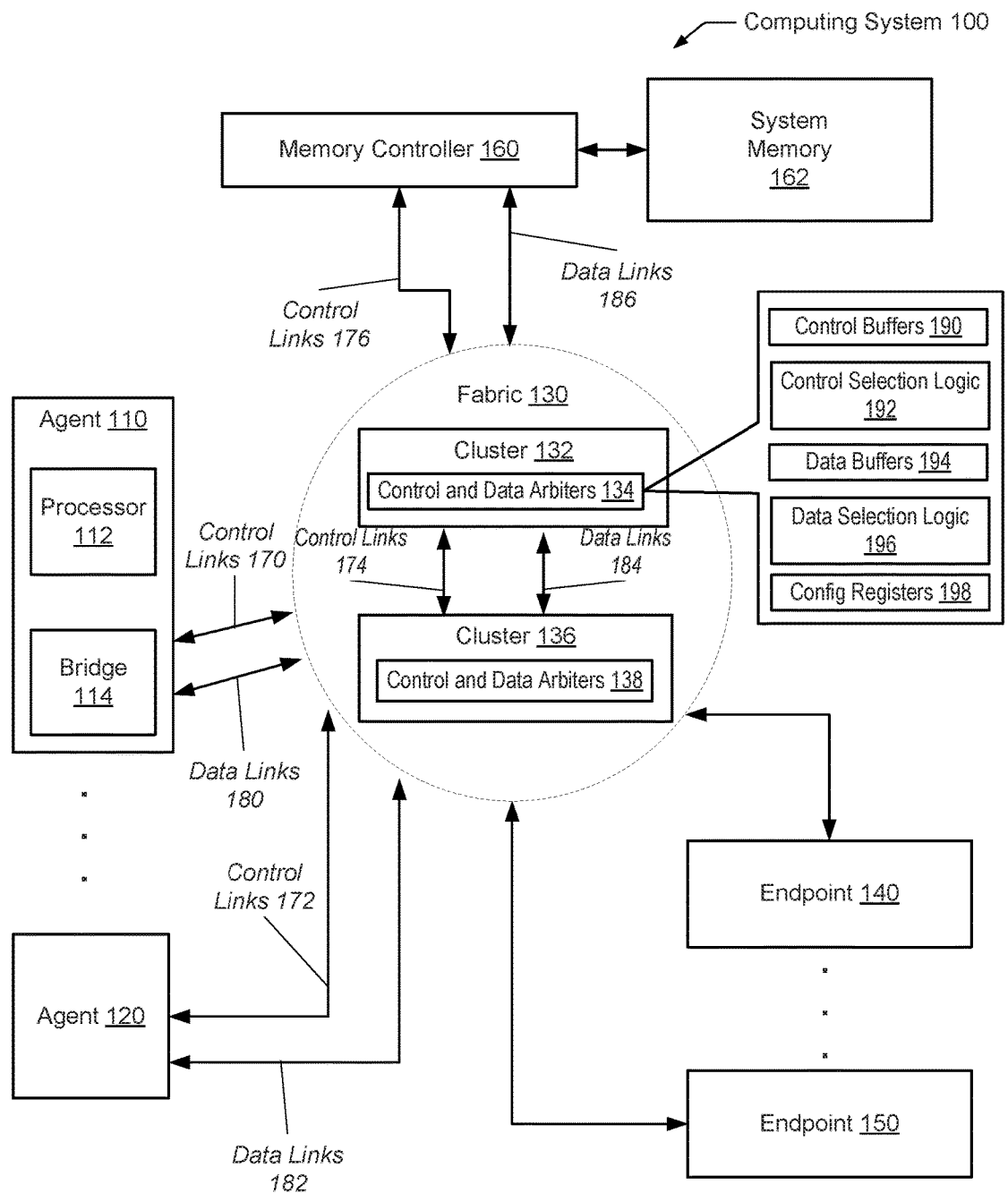
FIG. 1 is a block diagram of one embodiment of a computing system.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a generalized block diagram of one embodiment of a computing system 100 is shown. In the illustrated embodiment, communication fabric 130, which is also referred to as fabric 130, routes data among agents 110-120, endpoints 140-150 and memory controller 160. In various embodiments, fabric 130 includes a hierarchy of clusters between agents 110-120 and memory controller 160. Although two clusters 132 and 136 are shown, in other embodiments, any number of clusters is used.

In various embodiments, the computing system 100 is a system on a chip (SoC) that includes multiple types of integrated circuits on a single semiconductor die, each integrated circuit providing a separate functionality. In some embodiments, computing system 100 is also referred to as an application specific integrated circuit (ASIC). In other embodiments, the agents 110-120 and endpoints 140-150 are individual dies within a package such as a multi-chip module (MCM). In yet other embodiments, the agents 110-120 and endpoints 140-150 are individual dies or chips on a printed circuit board.

Clock sources, such as phase lock loops (PLLs), interrupt controllers, power managers and so forth are not shown in FIG. 1 for ease of illustration. It is also noted that the number of components of the computing system 100 vary from embodiment to embodiment. In other embodiments, there are more or fewer of each component than the number shown for the computing system 100. In an embodiment, each of the agents 110-120 is a processor complex. The term "processor complex" is used to denote a configuration of one or more processor cores using local storage (not shown), such as a local shared cache memory subsystem, and capable of processing a workload together. For example, in an embodiment, the workload includes one or more programs comprising instructions executed by processor 112. Any instruction set architecture is implemented in various embodiments.

Each of the agents 110-120 includes a processor such as processor 112. Although a single processor is shown, in various embodiments, multiple processors are used, each with one or more processor cores. Processor 112 is one or more of a central processing unit (CPU), a data parallel processor like a graphics processing units (GPU), a digital signal processors (DSP), a multimedia engine, and so forth.

Different types of data flows independently through fabric 130. In some embodiments, fabric 130 utilizes a single physical fabric bus to include a number of overlaying virtual channels, or dedicated source and destination buffers, each carrying a different type of data. In an embodiment, one or more channels are independently flow controlled with no dependence between transactions in different channels while other channels are dependent on transactions in another channel. In other embodiments, fabric 130 is packet-based, and may be hierarchical with bridges, cross bar, point-to-point, or other interconnects.

In various embodiments, fabric 130 uses one or more bus protocols for transferring messages and data, enforcing an order between transactions with particular transaction types, and ensuring cache coherence among the different agents 110-120 and endpoints 140-150. The supported communication protocols determine allowable transfer sizes, supported burst transfer sizes, supported directions for simultaneous transfers, allowable number of outstanding requests while sending more requests, support of out-of-order completions, supported clock domains, supported interrupt mechanisms, and so forth. In some embodiments, the link interfaces in bridge 114 and clusters 132 and 136 include communication protocol connections such as PCIe (Peripheral Component Interconnect Express), Advanced eXtensible Interface (AXI), InfiniBand, RapidIO, and so forth.

In addition to the link interfaces, clusters 132 and 136 include control and data arbiters 134 and 138 for routing control information, such as commands and messages, and corresponding data between a source and a destination. In an embodiment, the source is one of agents 110-120 for an upstream direction and the destination is memory controller 160. Between each hierarchical level are multiple links. For functionality and performance reasons, in various embodiments, a split topology is used where the data links 184 in fabric 130 are physically separated from the control links 174. Similarly, the interfaces to fabric 130 use a split topology. As shown, agent 110 uses control links 170 and separate data links 180. Although a split topology is not shown for endpoints 140-150, in various embodiments, endpoints 140-150 also use a split topology.

In various embodiments, control links 170-178 transfer commands and messages, whereas, data links 180-188 transfer data corresponding to the commands and messages. In some embodiments, the commands include read requests and write requests, and the messages indicate when response data is ready and provide an index of where the response data is stored in a cluster such as cluster 136. The data corresponding to the commands and messages include write data being sent from an agent, such as agent 110, to memory controller 160. The data also includes read response data from memory controller 160 to an agent such as agent 110.

In various embodiments, one or more of the control links 170-178 and data links 180-188 are a point-to-point communication channel. At the physical level, a link includes one or more lanes. In various embodiments, clusters 132 and 136 include split resources with control resources being used for processing commands and messages and separate data resources being used for processing data corresponding to the commands and messages. In various embodiments, control and data arbiters 134 and 138 include similar components. As shown, control and data arbiters 134 include control resources and separate data resources to support the split topology. Although separate control resources and data resources are shown only for control and data arbiters 134, in various embodiments, control and data arbiters 138 also includes control resources and separate data resources to support the split topology.

In various embodiments, control and data arbiters 134 include a combination of combinatorial logic and sequential elements. As shown, control and data arbiters 134 includes control buffers 190 for storing commands and/or messages and control selection logic 192 for selecting commands to send to a next stage in fabric 130 on control links 176. Control and data arbiters 134 also includes data buffers 194 for storing data corresponding to commands and messages, and data selection logic 196 for selecting stored data to send to a next stage in fabric 130 on data links 186. Control and data arbiters 134 additionally includes configuration registers 198 for storing control and status information, thresholds and so forth. In various embodiments, each of control selection logic 192 and data selection logic 196 use arbitration logic. In some embodiments, the functionality of one or more components of control and data arbiters 134 and 138 are implemented in hardware such as circuitry. In other embodiments, the functionality of one or more components of control and data arbiters 134 and 138 are implemented in a combination of hardware and software.

For upstream and downstream control links, control resources of the split resources in control and data arbiters 134 and 138 are used with received commands and messages for performing the above steps of storing, selecting, and sending on corresponding links. For upstream and downstream data links, data resources of the split resources in control and data arbiters 134 and 138 are used for performing the above steps with read response data and write data.

In an embodiment, processor 112 in agent 110 generates a write request and bridge 114 sends the write command of the write request on upstream control links 170 to memory controller 160. Bridge 114 also sends the write data of the write request on upstream data links 180 to memory controller 160. Control and data arbiters 138 in cluster 136 in fabric 130 receives the write command and the write data, and stores them in respective buffers such as control buffers 190 and data buffers 194.

Control selection logic 192 in control and data arbiters 138 selects the write command among other commands and messages based on attributes that include one or more of an age, a priority level, a quality-of-service parameter, a source identifier, an application identifier or type, such as a real-time application, an indication of traffic type, such as real-time traffic or low latency traffic or bulk traffic, a bandwidth requirement or a latency tolerance requirement, and an indication of a data size associated with the request and so forth. Similarly, data selection logic 196 in control and data arbiters 138 selects the write data of the write request among other data transactions based on one or more of a priority level, age, data size of the write data, and so forth. When selected, the write command is sent on the control links 174. When selected, the write data is sent on the data links 184. Since the control resources and the data resources are separated in control and data arbiters 138 to support the split topology, in various embodiments, the write command and the corresponding write data are sent from cluster 136 at different points in time on control links 174 and data links 184.

Control and data arbiters 134 in cluster 132 in fabric 130 receives the write command and the write data from control links 174 and data links 184, and stores them in respective buffers such as control buffers 190 and data buffers 194. In some embodiments, control selection logic 192 in control and data arbiters 138 selects commands and messages from control buffers 190 to send on control links 176 based on one or more of a priority level, age, data size of the transaction, and so forth. Similarly, data selection logic 196 in control and data arbiters 138 selects write data from data buffers 194 to send on data links 186 based on one or more of a priority level, age, data size of the transaction, and so forth. In some embodiments, data buffers 194 includes one or more upstream data stores for storing write data being sent to memory controller 160. In some embodiments, data stored in an upstream data store is stored in one or more of flip-flops or other types of registers, one of a variety of random access memory (RAM) cells, content addressable memory (CAM) structure, or other.

In various embodiments, control selectin logic 192 in cluster 132 in fabric 130 marks the write command as a candidate to be issued on control links 176 when control selectin logic 192 determines the write data will arrive ahead of the write command at memory controller 160. For example, control selectin logic 192 determines the write command will be issued on control links 176 after the write data is issued on data links 186. Therefore, the case is avoided where the memory controller 160 selects the write command for servicing, but not have write data for the servicing. Such a case reduces performance.

In an embodiment, control selectin logic 192 determines the write data will arrive at memory controller 160 via data links 186 ahead of the write command by detecting all of the write data has issued from data buffers 194 to the memory controller 160. In another embodiment, control selectin logic 192 determines the write data will arrive at memory controller 160 via data links 186 ahead of the write command by detecting all of the write data has issued from intermediate buffers to a last stage upstream data store within data buffers 194 from which the memory controller 160 will perform a pulling operation to retrieve write data. In other embodiments, control selectin logic 192 determines a latency for each of the write command and remaining data of the write data to reach memory controller 160 from cluster 132. Controller 134 determines the write data will arrive at memory controller 160 via data links 186 ahead of the write command on command links 176 when controller 134 determines the latency for the remaining write data is less than the latency for the write command. In some embodiments, the latencies are measured as clock cycles. In some embodiments, the latencies are based on remaining stages of pipelines arbitration logic in the control path and the separate data path.

In various embodiments, control selection logic 192 in control and data arbiters 134 prevents the write command from becoming a candidate to be issued on control links 176 when control selection logic 192 determines the write data may not arrive ahead of the write command at memory controller 160. For example, control selectin logic 192 determines the write command will be issued on control links 176 before the write data is issued on data links 186. The above description described synchronizing the write command and the associated write data at cluster 132 prior to reaching memory controller 160. In other embodiments, the synchronization occurs in another cluster at a lower hierarchical level in fabric 130.

In some embodiments, the above synchronization steps are also used for asynchronous write requests such as configuration write requests from agent to agent. In various embodiments, configuration register write requests traverse from a source agent, such as agent 120, through fabric 130 and memory controller 160 to a destination agent such as agent 110. In various embodiments, memory controller 160 is used as a single ordering point. In such cases, the above synchronization steps are used by control and data arbiters 138 in cluster 136, which sends the asynchronous write command on control links 170 to agent 110 and sends the associated write data on data links 180 to agent 110.

In yet other embodiments, the above synchronization steps are also used for read commands and read data transferred from memory controller 160 to the requesting agent such as agent 110. In such cases, in an embodiment, the above synchronization steps are used by control and data arbiters 134 in cluster 132, which sends the read command or a read message on control links 174 to cluster 136. Control and data arbiters 134 in cluster 132 also sends the read response data on data links 184 to cluster 136. The read message received at agent 110 indicates both when read response data is ready and an index of where the read response data is stored in cluster 136. Following, agent 110 sends a message on control links 170 to retrieve the read response data. With the above synchronization steps, when agent 110 receives the read message from cluster 136, the read response data is already located at cluster 136 and no stall cycles are used. In one embodiment, the read response data is stored in a downstream data store within data buffers 194. Before describing more details of the data transfer through fabric 130, a further description of the components in computing system 100 is provided.

In some embodiments, components within agent 120 are similar to components in agent 110. In other embodiments, components in agent 120 are designed for lower power consumption, and therefore, include control logic and processing capability producing less performance. In such embodiments, supported clock frequencies are less than supported clock frequencies in agent 110. In addition, one or more of the processor cores in agent 120 include a smaller number of execution pipelines and/or functional blocks for processing relatively high power consuming instructions than what is supported by the processor cores in agent 110.

Endpoints 140-150 are representative of any number and type of components coupled to fabric 130. For example, in some embodiments, endpoints 140-150 include one or more cameras, flash controllers, display controllers, media controllers, graphics units, communication interfaces such as radio communication interfaces, and/or other devices. Endpoints 140-150 are also representative of any number of input/output (I/O) interfaces or devices and provide interfaces to any type of peripheral device implementing any hardware functionality included in computing system 100. For example, in an embodiment, any of the endpoints 140-150 connect to audio peripherals such as microphones, speakers, interfaces to microphones and speakers, audio processors, digital signal processors, mixers, etc. Other I/O devices include interface controllers for various interfaces external to computing system 100, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a digital-to-analog converter (DAC), and so forth. Other I/O devices include networking peripherals such as media access controllers (MACs).

Memory controller 160 interfaces with system memory 162. Memory controller 160 includes any number of memory ports, generates proper clocking to memory devices, and interfaces to system memory 162. System memory 162 includes one or more of dynamic random access memory (DRAM) such as synchronous DRAM (SDRAM) (including mobile versions of the SDRAMs such as mDDR3, etc., and/or low power versions of the SDRAMs such as LPDDR4, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc.

Figure 2:
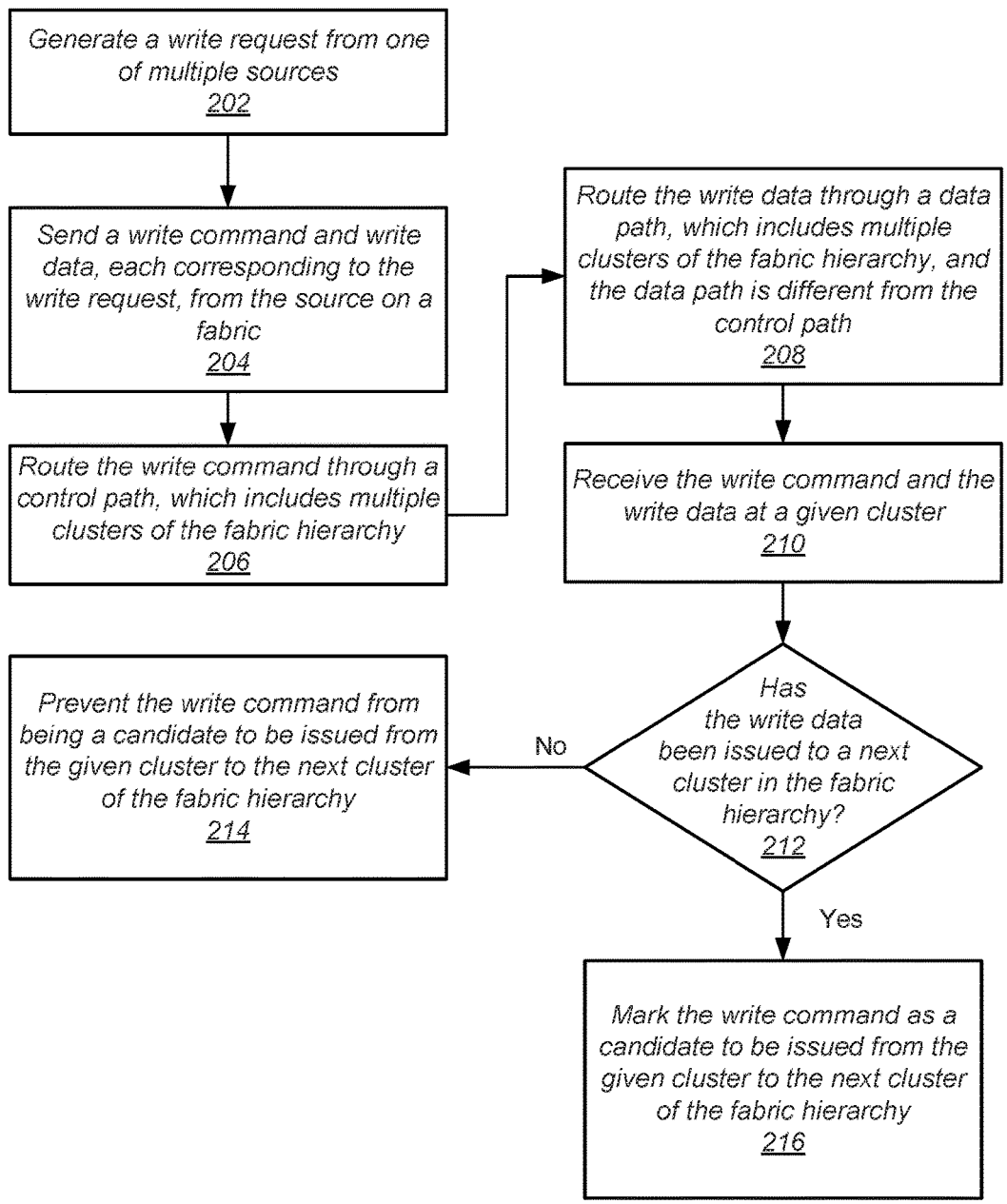
FIG. 2 is a flow diagram of one embodiment of a method for efficiently routing data in a communication fabric.

Referring now to FIG. 2, a generalized flow diagram of one embodiment of a method 200 for efficiently routing data in a communication fabric is shown. For purposes of discussion, the steps in this embodiment (as well as for FIG. 3) are shown in sequential order. However, in other embodiments some steps may occur in a different order than shown, some steps may be performed concurrently, some steps may be combined with other steps, and some steps may be absent.

A write request is generated from one of multiple sources (block 202). In various embodiments, an agent in a computing system generates the write request to send to system memory via a memory controller. Examples of an agent was provided earlier. In various embodiments, the fabric between the agent and the memory controller uses a split topology with a data path being separate from a control path. The source sends a write command and write data on a fabric, each corresponding to the write request, from the source to the destination (block 204). For example, the agent sends the write command of the write request on upstream control links to the memory controller. The agent also sends write data of the write request on upstream data links to the memory controller. The control path between the agent and the memory controller has a different latency than the separate data path between the agent and the memory controller.

In various embodiments, link interfaces include link controllers with split resources. Additionally, the link interfaces transfer commands and data on separate links in a split topology. The split resources include control resources being used for processing commands and messages transferred on the control links. Separate data resources are used for processing data corresponding to the commands and messages, which are transferred on data links different from the control links.

As described earlier, in various embodiments, the clusters in the fabric use split resources, which include a combination of combinatorial logic and sequential elements for storing data, selecting data to transfer, such as using arbitration logic, and sending the selected data on corresponding links. For upstream and downstream control links, control resources of the split resources are used with received commands and messages for performing the above steps. For upstream and downstream data links, data resources of the split resources in clusters are used for performing these steps.

The write command is routed through the control path, which includes multiple clusters of the fabric hierarchy (block 206). In some embodiments, one or more of the clusters include arbitration logic for selecting commands to send on control links based on one or more of a priority level, age, data size of the corresponding write data, and so forth. The write data is routed through a data path, which includes multiple clusters of the fabric hierarchy, and the data path is different from the control path (block 208).

The write command and the write data are received at a given cluster (block 210). In some embodiments, the given cluster is the last cluster in the fabric hierarchy prior to reaching the memory controller. In other embodiments, the given cluster is a cluster within the fabric hierarchy prior to reaching the last cluster. If the write data has not been issued to a next cluster in the fabric hierarchy ("no" branch of the conditional block 212), then the write command is prevented from being a candidate to be issued from the given cluster to the next cluster of the fabric hierarchy (block 214). In an embodiment, the next cluster is the memory controller. In another embodiment, the next cluster is one of the intermediate clusters within the fabric hierarchy. In some embodiments, the entire amount of write data has not been sent to the memory controller. In some embodiments, the determination at conditional block 212 determines whether all of the write data has issued from intermediate buffers to a last stage upstream data store from which the memory controller will perform a pulling operation to retrieve write data.

If the write data has been issued to the next cluster in the fabric hierarchy ("yes" branch of the conditional block 212), then the write command is marked as a candidate to be issued from the given cluster to the next cluster of the fabric hierarchy (block 216). Therefore, the write command does not arrive ahead of the write data at the next cluster. In an embodiment, the next cluster is the memory controller. In another embodiment, the next cluster is one of the clusters within the fabric. In some embodiments, the entire amount of write data has been sent to the memory controller. Although the above synchronization steps are described for write requests to system memory, as described earlier, in some embodiments, the synchronization steps are also used for read response data sent from the memory controller to the requesting agent as well as used for asynchronous write requests from a source agent to a destination agent via the memory controller.

Figure 3:
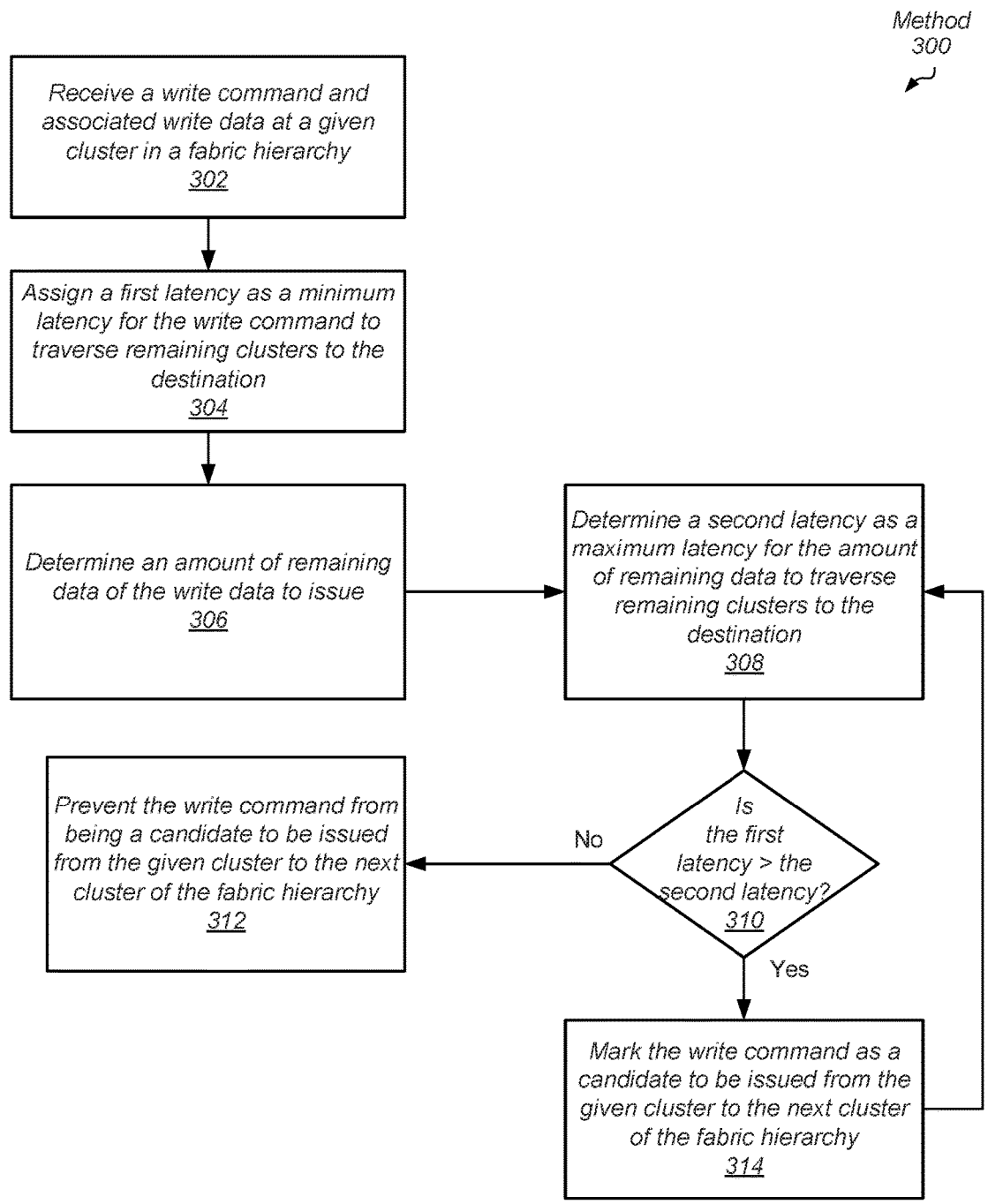
FIG. 3 is a flow diagram of one embodiment of a method for efficiently routing data in a communication fabric.

Referring now to FIG. 3, a generalized flow diagram of one embodiment of a method 300 for efficiently routing data in a communication fabric is shown. A write command and associated write data are received at a given cluster in a fabric hierarchy (block 302). In some embodiments, each of a first latency and a second latency is determined and then compared. In an embodiment, a first latency is assigned as a minimum latency for the write command to traverse remaining clusters to the destination (block 304). In some embodiments, the minimum latency is a known number of clock cycles read from a register or other sequential element. In some embodiments, the given cluster is the last cluster in the fabric hierarchy prior to reaching the memory controller. Therefore, the stored number of clock cycles is the minimum number of clock cycles for the write command to traverse the control resources in the given cluster. In various embodiments, the number of clock cycles is known during the design stage of the computing system. In some embodiments, multiple levels of arbitration and multiplexing logic are included in the control resources. In other embodiments, the given cluster is a cluster within the fabric hierarchy prior to reaching the last cluster. Therefore, the stored number of clock cycles is the minimum number of clock cycles for the write command to traverse the control resources in each of the clusters prior to reaching the memory controller.

An amount of remaining data of the write data to issue is determined (block 306). In an embodiment, the amount of data is measured as a data size. In another embodiment, the amount of data is measured as a number of clock cycles to completely issue the remaining data from the given cluster. In an embodiment, a second latency is determined as a maximum latency for the amount of remaining data to traverse remaining clusters to the destination (block 308). In one embodiment, the destination is the memory controller. In another embodiment, the destination is an upstream data store from which the memory controller will perform a pulling operation to retrieve write data.

In an embodiment, the given cluster is the last cluster in the fabric hierarchy prior to reaching the memory controller. Therefore, the second latency is the maximum latency for the remaining write data to traverse the data resources in the given cluster. In some embodiments, multiple levels of arbitration and multiplexing logic are included in the data resources. In some embodiments, the maximum latency is the maximum number of clock cycles for the remaining write data to traverse the data resources in the given cluster. In other embodiments, the given cluster is a cluster within the fabric hierarchy prior to reaching the last cluster. Therefore, the second latency is the maximum latency for the remaining write data to traverse the data resources in each of the clusters prior to reaching the memory controller. In some embodiments, the maximum latency is the maximum number of clock cycles for the remaining write data to traverse the data resources in each of the clusters prior to reaching the memory controller.

In some embodiments, the first latency and the second latency are dynamically compared. If the first latency is not greater than the second latency ("no" branch of the conditional block 310), then in some embodiments, the write command is prevented from being a candidate to be issued from the given cluster to the next cluster of the fabric hierarchy (block 312). In an embodiment, the next cluster is the memory controller. In another embodiment, the next cluster is one of the clusters within the fabric. If the first latency is greater than the second latency ("yes" branch of the conditional block 310), then in some embodiments, the write command is marked as a candidate to be issued from the given cluster to the next cluster of the fabric hierarchy (block 314). In other embodiments, the first latency and the second latency are not dynamically determined and compared. Rather, other mechanisms are used to have the write data arrive at a particular destination prior to the arrival of the write command. The other mechanisms are further described below regarding methods 500 and 600 (of FIG. 5 and FIG. 6). In some embodiments, the destination is a memory controller. In other embodiments, the destination is a particular level of arbitration or a particular cluster level in the control path and the data path prior to arrival at the memory controller. In other embodiments, the destination is a target agent for an asynchronous write request such as configuration write requests from a source agent to the target agent. In yet other embodiments, the destination is a particular level of arbitration or a particular cluster level in the control path and the data path prior to arrival at the target agent.

Figure 4:
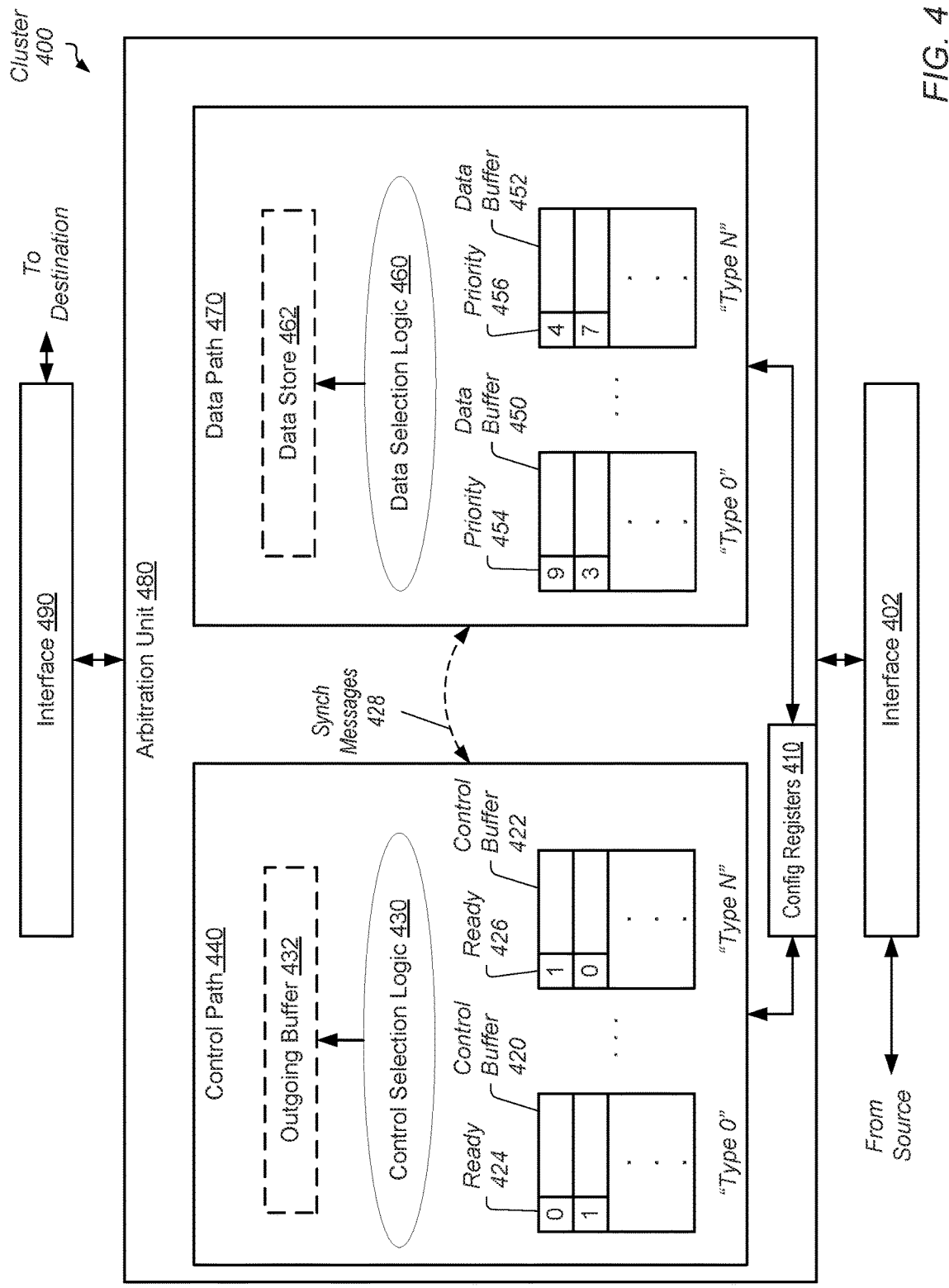
FIG. 4 is a block diagram of one embodiment of a cluster in a fabric hierarchy.

Turning next to FIG. 4, a block diagram of one embodiment of a cluster 400 in a fabric hierarchy is shown. As shown, cluster 400 includes an input interfaces 402 for receiving data from a source, an output interface 490 for sending data to a destination, and an arbitration unit 480. In the illustrated embodiment, arbitration unit 480 supports a split topology by including a control path 440 and a separate data path 470. In an embodiment, arbitration unit 480 also includes configuration registers 410 for storing control and status information, thresholds and so forth.

In an embodiment, each of interfaces 402 and 490 are link interfaces and include communication protocol connections such as PCIe (Peripheral Component Interconnect Express), Advanced eXtensible Interface (AXI), InfiniBand, RapidIO, and so forth. In an embodiment, the source is another cluster in a lower level of the fabric hierarchy than cluster 400. In another embodiment, the source is an agent in the computing system using the fabric hierarchy. In one embodiment, the destination is another cluster in a higher level of the fabric hierarchy than cluster 400. In another embodiment, the destination is a memory controller in the computing system using the fabric hierarchy.

As shown, control path 440 includes multiple control buffers 420-422 for storing commands received from the source. In various embodiments, each one of control buffers 420-422 is used for a respective type of command. For example, in an embodiment, commands are grouped by type based on one or more of a source identifier, an application identifier or type, such as a real-time application, an indication of traffic type, such as real-time traffic or low latency traffic or bulk traffic, a request type, such as a read request or a write request, request types requiring an acknowledgment of completion and request types not requiring the acknowledgment, and an indication of a data size associated with the request and so forth.

In various embodiments, control selection logic 430 selects one or more commands from control buffers 420-422 to send to the destination via upstream control links in interface 490. In some embodiments, control selection logic 430 selects the one or more stored commands from control buffers 420-422 based on one or more attributes that include an age, a priority level, a quality-of-service parameter, a source identifier, an application identifier or type, such as a real-time application, an indication of traffic type, such as real-time traffic or low latency traffic or bulk traffic, a bandwidth requirement or a latency tolerance requirement, and an indication of a data size associated with the request, and so forth.

In the illustrated embodiment, entries of control buffers 420-422 include fields 424-426 for indicating whether the stored commands are ready to proceed to a next level of arbitration logic. For example, in one embodiment, a single set of control buffers 420-422 are used and a non-partitioned control selection logic 430 is used. In such an embodiment, the next level of arbitration logic is the input of control selection logic 430. Therefore, the fields 424-426 are used to determine whether a stored command is a candidate to be received by the next stage of arbitration logic, which is the input of control selection logic 430. In one embodiment, the stored command is a candidate when an asserted value is stored in a respective field of fields 424-426, and the stored command is not a candidate when a negated value is stored in the respective field of fields 424-426. In some embodiments, a binary one is used as an asserted value and a binary zero is used as a negated value, but in other embodiments, the values are switched.

In some embodiments, control selection logic 430 includes pipelined arbitration logic with inter-stage storage elements between the pipelines or stages. In such an embodiment, the next level of arbitration logic is one of the input of an initial stage of control selection logic 430, the input of one of one or more intermediate stages of control selection logic 430, or the input of a final stage of control selection logic 430. Between each stage of control selection logic 430 are storage elements storing commands similar to control buffers 420-422. Therefore, the fields 424-426 are used to determine whether a stored command in control buffers 420-422 or in intermediate buffers used between pipeline stages of control selection logic 430 is a candidate to be received by the next stage of arbitration logic in control selection logic 430. Accordingly, a given command received by control path 440 is gated by fields 424-426 anywhere from the input stage to the final stage of control selection logic 430.

Whether the control selection logic 430 is partitioned with pipeline stages or not partitioned, the fields 424-426 are asserted by synchronization messages 428 received from the separate data path 470. In an embodiment, data path 470 sends an indication in synchronization messages 428 to the control path 440 specifying that given data has been issued to the destination. Control logic, which in one embodiment is in control selection logic 430, determines whether a given command corresponding to the given data is stored in control buffers 420-422 or one of the intermediate buffers between stages of control selection logic 430.

In an embodiment, the given command is identified by one or more of a source identifier, a portion of a target address or a complete target address, a process identifier, a group identifier, an application identifier, and so forth. If the given command is not identified, then the given data has passed on to the destination before the given command has arrived at control path 440. The information corresponding to the given data is stored and incoming commands stored in control buffers 420-422 are compared to the stored information to identify the given command. When identified, the corresponding field of fields 424-426 is asserted. In some embodiments, an indication of priority for selection by arbitration logic is also increased as the corresponding field of fields 424-426 is asserted to make the given command a candidate to continue being arbitrated. In other embodiments, the indication of priority for selection by arbitration logic is unchanged as the corresponding field of fields 424-426 is asserted to make the given command a candidate to continue being arbitrated.

In another embodiment, prior to the given data is issued to the destination, data path 470 sends an indication in synchronization messages 428 to the control path 440 specifying that the given data has been issued to a given stage of arbitration logic in data selection logic 460. Similar to control selection logic 430, in an embodiment, data selection logic 460 is partitioned into pipeline stages, although the number of levels and the complexity of the stages are different from control selection logic 430. In some embodiments, control path 440 includes outgoing buffers 432 as a final stage of storing commands before issuing them to the destination via interface 490. In some embodiments, commands stored in outgoing buffers 432 have a negated field of fields 424-426, and these commands are not issued to the destination until the data path 470 sends an indication in synchronization messages 428 to assert the field. In other embodiments, commands are unable to reach outgoing buffers 432 until an earlier stage of buffering, whether it is control buffers 420-422 or an intermediate pipeline stage in control selection logic 430, has the field of fields 424-426 asserted as a result data path 470 has sent the indication in synchronization messages 428 to assert the field.

In some embodiments, data path 470 includes data store 462 as a final stage of storing data before issuing the data to the destination via upstream data links in interface 490. In some embodiments, prior to the given data is issued to the destination, data path 470 sends the indication in synchronization messages 428 to the control path 440 specifying that the given data has been issued to the data store 462. As shown, the data path 470 includes multiple data buffers 450-452 for storing commands received from the source. In various embodiments, each one of data buffers 450-452 is used for a respective type of data. In some embodiments, the received data is grouped by type in a similar manner as the commands in control path 440. In various embodiments, data selection logic 460 selects data from data buffers 450-452 to send to the destination via upstream data links in interface 490.

In the illustrated embodiment, entries of data buffers 450-452 include fields 454-456 for indicating a priority level used to determine whether data is selected to proceed to a next level of arbitration logic. For example, in one embodiment, a single set of data buffers 450-452 are used and a non-partitioned data selection logic 460 is used. In such an embodiment, the next level of arbitration logic is the input of data selection logic 460. Therefore, the fields 454-456 are used to determine whether stored data is selected to proceed to the next stage of arbitration logic, which is the input of data selection logic 460.

In some embodiments, data selection logic 460 includes pipelined arbitration logic with inter-stage storage elements between the pipelines or stages. In such an embodiment, the next level of arbitration logic is one of the input of an initial stage of data selection logic 460, the input of one of one or more intermediate stages of data selection logic 460, or the input of a final stage of data selection logic 460. Between each stage of data selection logic 460 are storage elements storing commands similar to data buffers 450-452. Therefore, the fields 454-456 are used to determine whether stored data stored in data buffers 450-452 or in intermediate buffers used between pipeline stages of data selection logic 460 is selected to proceed to the next stage of arbitration logic.

Whether the data selection logic 460 is partitioned with pipeline stages or not partitioned, in an embodiment, the priorities stored in fields 454-456 are increased by synchronization messages 428 received from the separate control path 440. In an embodiment, control path 440 sends an indication in synchronization messages 428 to the data path 470 specifying that a given command has reached a particular stage of arbitration logic. In an embodiment, the particular stage is the control buffers 420-422. In another embodiment, the particular stage is one of an intermediate pipeline stage in control selection logic 430 and the outgoing buffers 432. Control logic, which in one embodiment is in data selection logic 460, determines whether given data corresponding to the given command is stored in data buffers 450-452 or one of the intermediate buffers between stages of data selection logic 460.

Similar to identifying the given command in the control path 440, in an embodiment, the given data is identified in the data path 470 by one or more of a source identifier, a portion of a target address or a complete target address, a process identifier, a group identifier, an application identifier, and so forth. If the given data is not identified, then the given command is further ahead in control path 440 of the corresponding given data in data path 470. In fact, the given data has not arrived at this point in time in data path 470. The information corresponding to the given command is stored and incoming data stored in data buffers 450-452 are compared to the stored information to identify the given data. When identified, the corresponding field of fields 454-456 has the priority increased in order to expedite the given data through data selection logic 460 and arrive sooner at data store 462, if it exists, and the destination.

Figure 5:
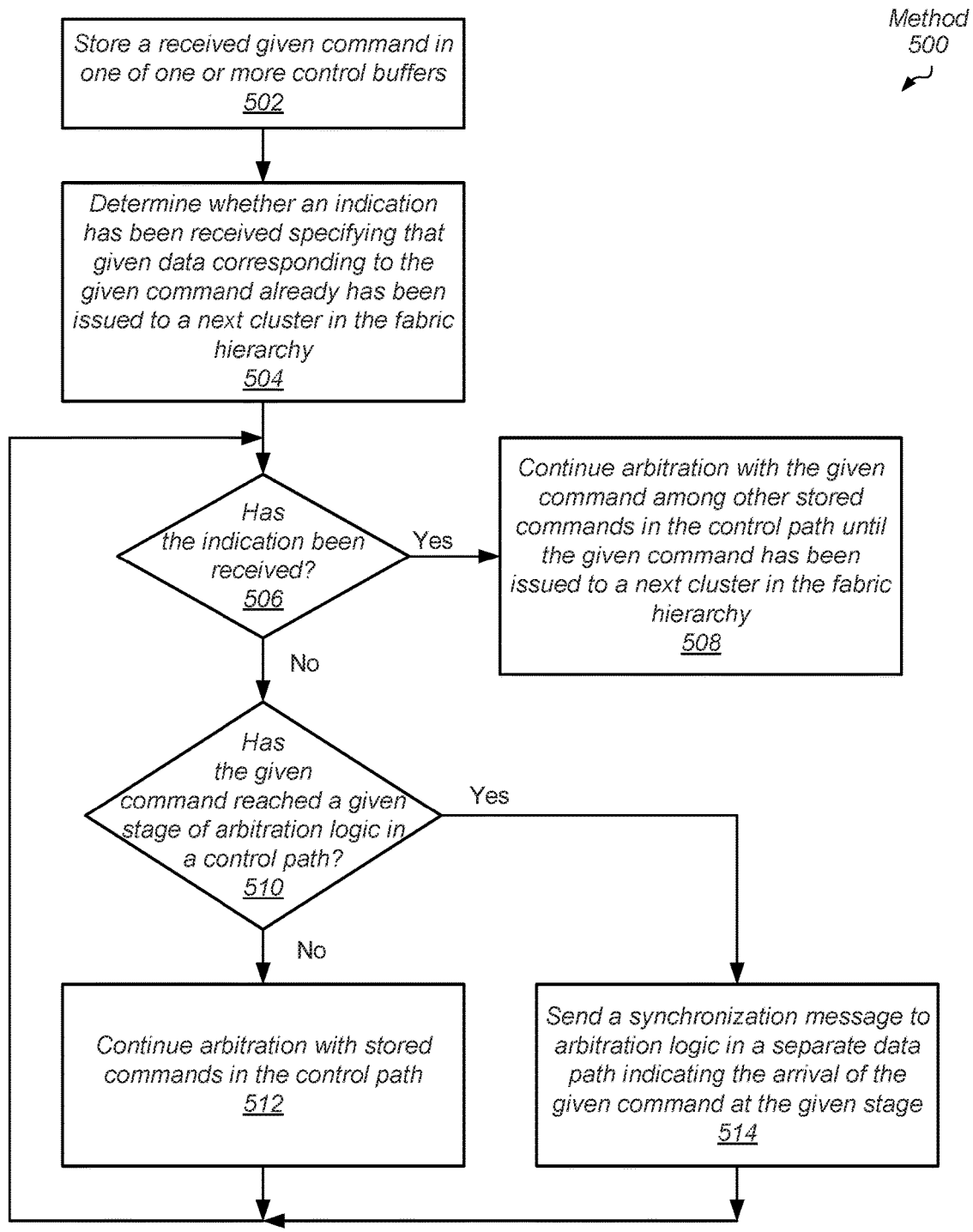
FIG. 5 is a flow diagram of one embodiment of a method for efficiently routing data in a communication fabric.

Referring now to FIG. 5, a generalized flow diagram of one embodiment of a method 500 for efficiently routing data in a communication fabric is shown. A received given command is stored in one of one or more control buffers (block 502). It is determined whether an indication has been received specifying that given data corresponding to the given command already has been issued to a next cluster in the fabric hierarchy (block 504). If the indication has been received ("yes" branch of the conditional block 506), then arbitration is continued with the given command among other stored commands in the control path until the given command has been issued to a next cluster in the fabric hierarchy (block 508).

If the indication has not been received ("no" branch of the conditional block 506), and the given command has not reached a given stage of arbitration logic in a control path ("no" branch of the conditional block 510), then arbitration continues with stored commands in the control path (block 512). As described earlier, the given stage of arbitration logic is one of an input to control arbitration logic, an input to an intermediate stage of pipelined control arbitration logic, an input to a final stage of pipelined control arbitration logic, or an output of a final stage of pipelined control arbitration logic.

If the indication has not been received ("no" branch of the conditional block 506), and the given command has reached the given stage of arbitration logic in a control path ("yes" branch of the conditional block 510), then a synchronization message is sent to arbitration logic in a separate data path indicating the arrival of the given command at the given stage (block 514). In some embodiments, the synchronization message is used to prevent the given command from getting ahead of the given data at a later stage of processing.

Figure 6:
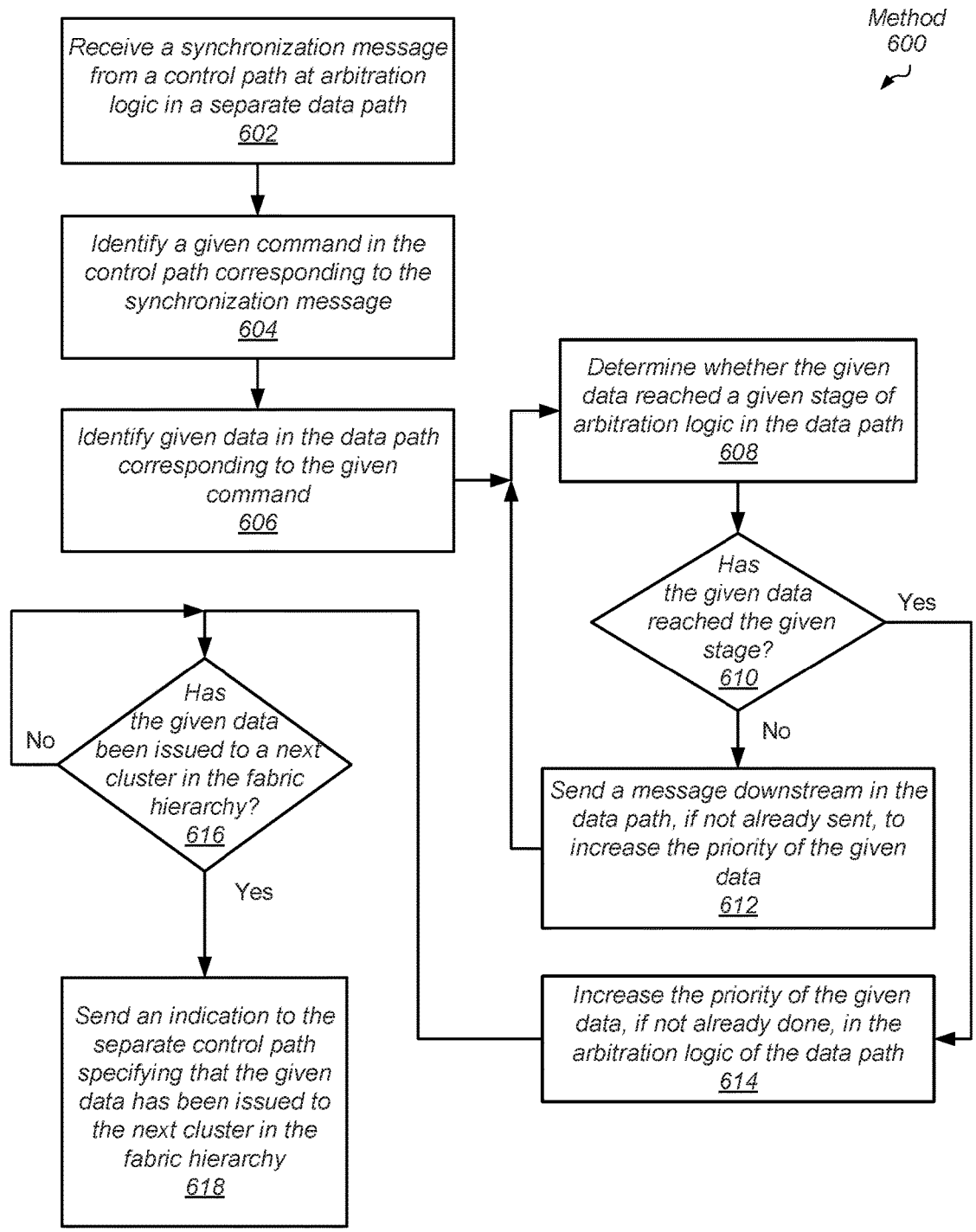
FIG. 6 is a flow diagram of one embodiment of a method for efficiently routing data in a communication fabric.

Turning now to FIG. 6, a generalized flow diagram of one embodiment of a method 600 for efficiently routing data in a communication fabric is shown. A synchronization message is received from a control path at arbitration logic in a separate data path (block 602). A given command in the control path corresponding to the synchronization message is identified (block 604). As described earlier, in an embodiment, the given command is identified by one or more of a source identifier, a portion of a target address or a complete target address, a process identifier, a group identifier, one or more of a channel, a virtual channel and a sub-channel number, an application identifier, and so forth. Similarly, given data in the data path corresponding to the given command is identified (block 606). For example, one or more of the above listed information is also used to identify the given data. One of a variety of methods is used to associate the given command and the given data It is determined whether the given data reached a given stage of arbitration logic in the data path (block 608). As described earlier, the given stage of arbitration logic is one of an input to data arbitration logic, an input to an intermediate stage of pipelined data arbitration logic, or an input to a final stage of pipelined data arbitration logic. If the given data has not reached the given stage ("no" branch of the conditional block 610), then, in one embodiment, a message is sent downstream in the data path, if not already sent, to increase the priority of the given data (block 612). In another embodiment, no message is sent downstream in the data path, but rather, control logic waits for the given data to traverse the downstream stages in the data path and arrive at the given stage. Control flow of method 600 then returns to block 608.

If the given data has reached the given stage ("yes" branch of the conditional block 610), then, in an embodiment, the priority of the given data is increased, if not already done, in the arbitration logic of the data path (block 614). If the given data has been issued to a next cluster in the fabric hierarchy ("yes" branch of the conditional block 616), then in some embodiments, an indication is sent to the separate control path specifying that the given data has been issued to the next cluster in the fabric hierarchy (block 618). In some embodiments, the indication is used to prevent the given command from getting ahead of the given data at a later stage of processing.

Figure 7:
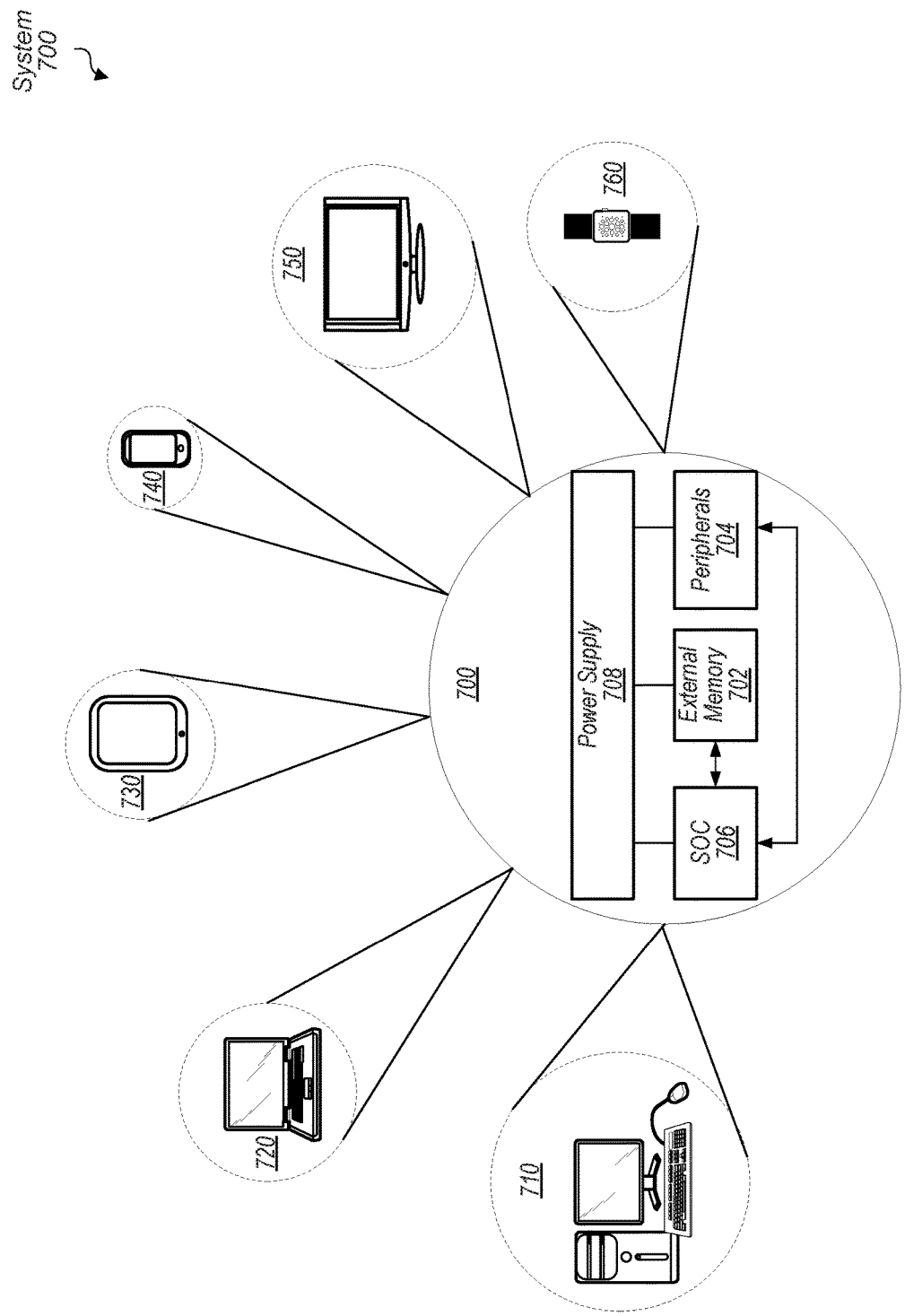
FIG. 7 is a block diagram of one embodiment of a system.

Turning next to FIG. 7, a block diagram of one embodiment of a system 700 is shown. As shown, system 700 may represent chip, circuitry, components, etc., of a desktop computer 710, laptop computer 720, tablet computer 730, cell or mobile phone 740, television 750 (or set top box coupled to a television), wrist watch or other wearable item 760, or otherwise. Other devices are possible and are contemplated. In the illustrated embodiment, the system 700 includes at least one instance of a system on chip (SoC) 706 which includes multiple agents, a communication fabric, one or more data stores, and link controllers for efficiently routing data in a communication fabric. For example, in some embodiments, SoC 706 includes components similar to computing system 100 (of FIG. 1). In various embodiments, SoC 706 is coupled to external memory 702, peripherals 704, and power supply 708.

A power supply 708 is also provided which supplies the supply voltages to SoC 706 as well as one or more supply voltages to the memory 702 and/or the peripherals 704. In various embodiments, power supply 708 represents a battery (e.g., a rechargeable battery in a smart phone, laptop or tablet computer). In some embodiments, more than one instance of SoC 706 is included (and more than one external memory 702 may be included as well).

The memory 702 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 704 include any desired circuitry, depending on the type of system 700. For example, in one embodiment, peripherals 704 includes devices for various types of wireless communication, such as Wi-Fi, Bluetooth, cellular, global positioning system, etc. In some embodiments, the peripherals 704 also include additional storage, including RAM storage, solid state storage, or disk storage. The peripherals 704 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   an upstream control link and an upstream data link different from the upstream control link, each configured to transfer data to an external upstream cluster;
   a downstream control link and a downstream data link different from the downstream control link, each configured to transfer data to an external downstream cluster;
   a first buffer configured to store write data corresponding to a write request received on the downstream data link;
   a second buffer configured to store a write command corresponding to the write request received on the downstream control link; and
   control logic configured to mark the write command as a candidate to be issued on the upstream control link, in response to determining the write data will arrive at a destination before the write command after being issued on the upstream data link.

2. The apparatus as recited in claim 1, wherein the control logic is configured to prevent the write command from becoming a candidate to be issued on the upstream control link, in response to determining the write data may not arrive ahead of the write command at a destination after being issued on the upstream data link.

3. The apparatus as recited in claim 1, wherein determining the write data will arrive before the write command comprises detecting, by the control logic, all of the write data has issued.

4. The apparatus as recited in claim 1, wherein the control logic is further configured to assign a minimum latency as a latency for the write command to reach the destination after being issued.

5. The apparatus as recited in claim 4, wherein the destination is a memory control logic, and wherein the minimum latency comprises traversing arbitration logic prior to reaching the memory control logic.

6. The apparatus as recited in claim 4, wherein the control logic is further configured to determine a maximum latency for given data to reach the destination after being issued, wherein the given data is a portion of the write data that has not been issued.

7. The apparatus as recited in claim 6, wherein determining the write data will arrive via the upstream data link ahead of the write command comprises determining the maximum latency is less than the minimum latency.

8. The apparatus as recited in claim 1, wherein in response to determining the write command has reached a given stage of control arbitration logic used to determine when to issue the write command on the upstream control link, the control logic is configured to increase priority of the write data, wherein the priority is used by data arbitration logic for determining when to issue the write data on the upstream data link.

9. A method, comprising:
- transferring, by an upstream control link and an upstream data link different from the upstream control link, data to an external upstream cluster;
- transferring, by a downstream control link and a downstream data link different from the downstream control link, data to an external downstream cluster;
- storing in a first buffer write data corresponding to a write request received on the downstream data link;
- storing in a second buffer write command corresponding to the write request received on the downstream control link; and
- marking, by a controller, the write command as a candidate to be issued on the upstream control link, in response to determining the write data will arrive at a destination before the write command after being issued on the upstream data link.

10. The method as recited in claim 9, further comprising preventing the write command from becoming a candidate to be issued on the upstream control link, in response to determining the write data may not arrive ahead of the write command at a destination after being issued on the upstream data link.

11. The method as recited in claim 9, further comprising assigning, by the controller, a minimum latency as a latency for the write command to reach the destination after being issued.

12. The method as recited in claim 11, further comprising determining, by the controller, a maximum latency for given data to reach the destination after being issued, wherein the given data is a portion of the write data that has not been issued.

13. The method as recited in claim 12, wherein determining the write data will arrive via the upstream data link ahead of the write command comprises determining the maximum latency is less than the minimum latency.

14. The method as recited in claim 12, wherein in response to determining the write command has reached a given stage of control arbitration logic used to determine when to issue the write command on the upstream control link, the method further comprises increasing priority of the write data, wherein the priority is used by data arbitration logic for determining when to issue the write data on the upstream data link.

15. A non-transitory computer readable storage medium storing program instructions, wherein the program instructions are executable by a processor to:
- transfer data to an external upstream cluster through an upstream control link and an upstream data link different from the upstream control link;
- transfer data to an external downstream cluster through a downstream control link and a downstream data link different from the downstream control link;
- store in a first buffer write data corresponding to a write request received on the downstream data link;
- store in a second buffer write command corresponding to the write request received on the downstream control link; and
- mark the write command as a candidate to be issued on the upstream control link, in response to determining the write data will arrive at a destination before the write command after being issued on the upstream data link.

16. The non-transitory computer readable storage medium as recited in claim 15, wherein the program instructions are further executable by a processor to prevent the write command from becoming a candidate to be issued on the upstream control link, in response to determining the write data may not arrive ahead of the write command at a destination after being issued on the upstream data link.

17. The non-transitory computer readable storage medium as recited in claim 15, wherein the program instructions are further executable by a processor to assign a minimum latency as a latency for the write command to reach the destination after being issued.

18. The non-transitory computer readable storage medium as recited in claim 17, wherein the destination is a memory controller, and wherein the minimum latency comprises traversing arbitration logic prior to reaching the memory controller.

19. The non-transitory computer readable storage medium as recited in claim 17, wherein the program instructions are further executable by a processor to determine a maximum latency for given data to reach the destination after being issued, wherein the given data is a portion of the write data that has not been issued.

20. The non-transitory computer readable storage medium as recited in claim 19, wherein determining the write data will arrive via the upstream data link ahead of the write command comprises determining the maximum latency is less than the minimum latency.

* * * * *